(12) United States Patent
Ackerman et al.

(10) Patent No.: US 9,256,987 B2
(45) Date of Patent: Feb. 9, 2016

(54) TRACKING HEAD MOVEMENT WHEN WEARING MOBILE DEVICE

(71) Applicant: MICROSOFT TECHNOLOGY LICENSING, LLC, Redmond, WA (US)

(72) Inventors: Nathan Ackerman, Seattle, WA (US); Drew Steedly, Redmond, WA (US); Andy Hodge, Palo Alto, CA (US); Alex Aben-Athar Kipman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 217 days.

(21) Appl. No.: 13/925,314

(22) Filed: Jun. 24, 2013

(65) Prior Publication Data

US 2014/0375680 A1    Dec. 25, 2014

(51) Int. Cl.
| | |
|---|---|
| *G09G 5/00* | (2006.01) |
| *G06T 19/00* | (2011.01) |
| *G02B 27/01* | (2006.01) |
| *G02B 27/00* | (2006.01) |

(52) U.S. Cl.
CPC .......... *G06T 19/006* (2013.01); *G02B 27/0093* (2013.01); *G02B 27/017* (2013.01); *G02B 2027/014* (2013.01); *G02B 2027/0178* (2013.01); *G02B 2027/0187* (2013.01); *G06F 2200/1637* (2013.01)

(58) Field of Classification Search
CPC ......... G06F 3/013; G06F 3/011; G06F 3/012; G02B 27/017
See application file for complete search history.

(56) References Cited

U.S. PATENT DOCUMENTS

| | | |
|---|---|---|
| 5,267,708 A | 12/1993 | Monson et al. |
| 6,377,401 B1 | 4/2002 | Bartlett |
| 6,452,574 B1 | 9/2002 | Lasko-Harvill et al. |
| 7,050,078 B2 | 5/2006 | Dempski |

(Continued)

FOREIGN PATENT DOCUMENTS

| | | |
|---|---|---|
| WO | WO2012172719 | 12/2012 |
| WO | 2013/028813 A1 | 2/2013 |

OTHER PUBLICATIONS

Amendments under Article dated Dec. 18, 2014, PCT Application No. PCT/US2014/042881.

(Continued)

*Primary Examiner* — Lixi C Simpson
(74) *Attorney, Agent, or Firm* — Dan Choi; Judy Yee; Micky Minhas

(57) ABSTRACT

Methods for tracking the head position of an end user of a head-mounted display device (HMD) relative to the HMD are described. In some embodiments, the HMD may determine an initial head tracking vector associated with an initial head position of the end user relative to the HMD, determine one or more head tracking vectors corresponding with one or more subsequent head positions of the end user relative to the HMD, track head movements of the end user over time based on the initial head tracking vector and the one or more head tracking vectors, and adjust positions of virtual objects displayed to the end user based on the head movements. In some embodiments, the resolution and/or number of virtual objects generated and displayed to the end user may be modified based on a degree of head movement of the end user relative to the HMD.

20 Claims, 11 Drawing Sheets

(56) References Cited

U.S. PATENT DOCUMENTS

| | | | | |
|---|---|---|---|---|
| 8,223,024 | B1* | 7/2012 | Petrou | 340/573.1 |
| 2006/0256140 | A1* | 11/2006 | Turner | 345/690 |
| 2007/0296646 | A1 | 12/2007 | Yamamoto et al. | |
| 2012/0242560 | A1 | 9/2012 | Nakada | |
| 2012/0274750 | A1 | 11/2012 | Strong | |
| 2012/0306850 | A1 | 12/2012 | Balan et al. | |
| 2012/0327116 | A1 | 12/2012 | Liu et al. | |
| 2013/0038510 | A1* | 2/2013 | Brin et al. | 345/8 |
| 2013/0050258 | A1 | 2/2013 | Liu et al. | |
| 2013/0083003 | A1 | 4/2013 | Perez | |
| 2013/0235169 | A1* | 9/2013 | Kato et al. | 348/53 |
| 2014/0160170 | A1* | 6/2014 | Lyons | 345/676 |
| 2014/0361977 | A1* | 12/2014 | Stafford et al. | 345/156 |

OTHER PUBLICATIONS

"International Search Report & Written Opinion for PCT Application No. PCT/US2014/042881", Mailed Date: Sep. 4, 2014, 12 Pages.

Shaw, et al., "An Experiment to Characterize Head Motion in VR and RR Using MR", In Proceedings of Western Computer Graphics Symposium, Apr. 6, 1992, 3 pages.

Jaekl, et al., "Perceptual Stability During Head Movement in Virtual Reality", In Proceedings of IEEE Virtual Reality Conference, Mar. 24, 2002, 7 pages.

Jerald, Jason J., "Scene-Motion- and Latency-Perception Thresholds for Head-Mounted Displays", A Dissertation Submitted to the Faculty of the University of North Carolina, Oct. 11, 2010, 207 pages.

Foxlin, et al., "Miniature 6-DOF Inertial System for Tracking HMDs", In Aerospace/Defense Sensing and Controls. International Society for Optics and Photonics, Aug. 1998, 15 pages.

Jay, et al., "Amplified Head Movements in Head Mounted Displays", In Journal of Presence: Teleoperators and Virtual Environments, vol. 12, Issue 3, Jun. 2003, 1 page.

Rothkopf, et al., "Head Movement Estimation for Wearable Eye Tracker", In Proceedings of the Symposium on Eye Tracking Research & Applications, Mar. 22, 2004, 8 pages.

Maeda, et al., "Tracking of User Position and Orientation by Stereo Measurement of Infrared Markers and Orientation Sensing", In Proceedings of the Eighth International Symposium on Wearable Computers, Nov. 7, 2004, 8 pages.

Written Opinion of the International Preliminary Examining Authority dated May 19, 2015, PCT Application No. PCT/US2014/042881.

* cited by examiner

US 9,256,987 B2

TRACKING HEAD MOVEMENT WHEN WEARING MOBILE DEVICE

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device that needs to be augmented as the mobile device moves within the real-world environment.

SUMMARY

Technology is described for tracking the head position of an end user of a head-mounted display device (HMD) relative to the HMD over time. In some embodiments, the HMD may determine an initial head position of the end user relative to the HMD, determine one or more subsequent head positions of the end user relative to the HMD, track head movements of the end user over time based on the one or more subsequent head positions, and adjust the location of virtual objects displayed to the end user based on the head movements of the end user. In some embodiments, the resolution and/or number of virtual objects generated and displayed to the end user may be modified based on a degree of head movement of the end user relative to the HMD.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
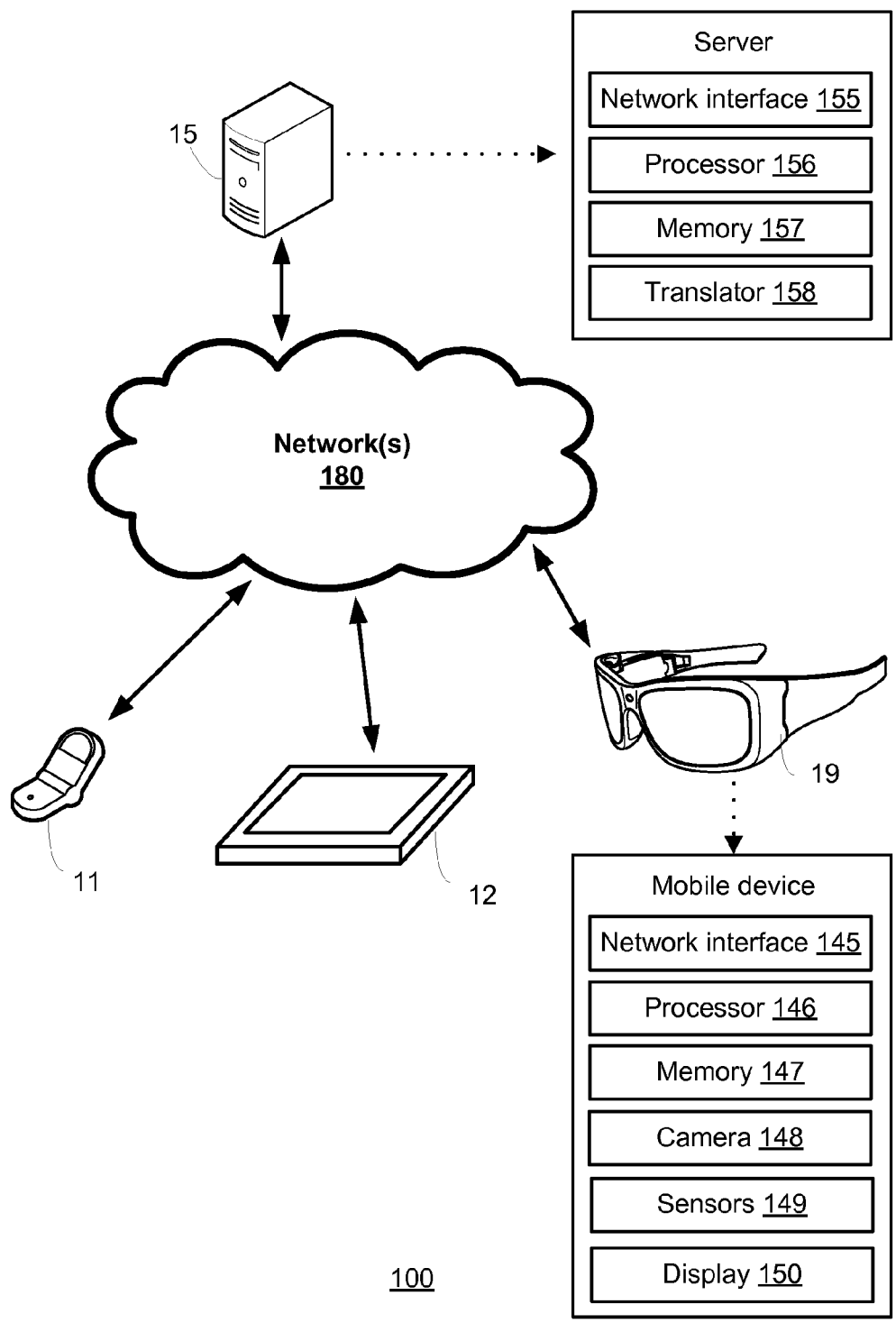
FIG. 1 is a block diagram of one embodiment of a networked computing environment in which the disclosed technology may be practiced.

Technology is described for tracking the head position of an end user of a head-mounted display device (HMD) relative to the HMD over time. In some embodiments, the HMD may determine an initial head tracking vector associated with an initial head position of the end user relative to the HMD, determine one or more head tracking vectors corresponding with one or more subsequent head positions of the end user relative to the HMD, track head movements of the end user over time based on the initial head tracking vector and the one or more head tracking vectors, and adjust positions of virtual objects displayed to the end user based on the head movements of the end user. In this case, if the end user's head position (or eye position) shifts relative to an initial placement with respect to the HMD (e.g., due to the end user riding on a bumpy road or accidentally touching the HMD as they wear the HMD), then the HMD may adjust the position of virtual objects displayed to the end user such that the virtual objects appear to be fixed or otherwise located appropriately within the augmented reality environment. In some embodiments, the resolution and/or number of virtual objects generated and displayed to the end user may be modified based on a degree of head movement relative to the HMD. In one example, both the resolution and number of virtual objects displayed to the end user may be reduced if the degree of head movement exceeds a threshold (e.g., if the end user's head position moves more than four centimeters relative to the HMD from an initial head position). The HMD may also provide a notification to the end user (e.g., a display notification or audio notification) if the degree of head movement exceeds the threshold.

In some cases, an HMD may capture images of an end user's eyes and/or the end user's facial region surrounding the eyes while the end user is viewing an augmented reality environment using the HMD. The images may be captured using one or more inward facing cameras (e.g., eye tracking cameras) integrated with the HMD. As the end user's eyes are fixed relative to their head position, fixed feature points associated with the end user's eyes may be used to determine a head position associated with the end user. The HMD may apply image processing techniques to the captured images in order to detect and track eye features such as the inner canthus (i.e., the inner corner or portion of the eye closest to the nasal bridge where the upper and lower eyelids meet) and the outer canthus (i.e., the outer corner or portion of the eye farthest from the nasal bridge where the upper and lower eyelids meet). Other eye features such as the pupil and iris may also be identified and tracked in order to determine eye position relative to the HMD. Once feature points associated with one or both of the end user's eyes are identified, position and orientation information associated with a 3D model of the end user's eyes may be updated based on the feature points, and a head position vector (e.g., represented as a 2D or 3D vector within a coordinate space relative to the HMD) may be determined based on the 3D model of the end user's eyes. The HMD may also detect and track fixed facial features such as portions of an end users' nasal bridge in order to determine a position and/or orientation of the end user's head (or eyes) relative to the HMD.

In one embodiment, an absolute head position vector representing the end user's head position relative to an environment in which the HMD exists may be determined by determining a pose vector associated with a pose of the HMD within the environment and then adding a vector offset based on a head position vector of the end user relative to the HMD. The absolute head position vector may be transmitted by the HMD to a server (e.g., associated with a retail store) or used by an application running on the HMD (e.g., a gaming application). In some embodiments, the HMD may use images of the environment captured from an outward facing camera in order to determine a six degree of freedom (6DOF) pose corresponding with the images relative to a 3D map of the environment. The 6DOF pose may comprise information associated with the position and orientation of the HMD within the environment. The 6DOF pose may be used for localizing the HMD and for generating images of virtual objects such that the virtual objects appear to exist at appropriate locations within the environment. More information regarding determining a 6DOF pose can be found in U.S. patent application Ser. No. 13/152,220, "Distributed Asynchronous Localization and Mapping for Augmented Reality," incorporated herein by reference in its entirety. More information regarding performing pose estimation and/or localization for a mobile device can be found in U.S. patent application Ser. No. 13/017,474, "Mobile Camera Localization Using Depth Maps," incorporated herein by reference in its entirety.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, an HMD, such as mobile device 19, may provide an augmented reality environment including a virtual object to an end user of the HMD. Periodically (e.g., every 0.5 ms), the HMD may determine the end user's head position relative to the HMD and adjust the position of images associated with the virtual object displayed to the end user such that the virtual object appears to be fixed within the augmented reality environment even though the end user's head position relative to the HMD has changed. The ability to adjust the position of images associated with the virtual object based on the end user's head position relative to the HMD allows the HMD to provide a consistent augmented reality environment to the end user even though the end user's eye position may shift relative to a see-through display of the HMD over time (e.g., due to the end user riding on a bumpy road or accidentally touching the HMD as they wear the HMD).

Figure 2A:
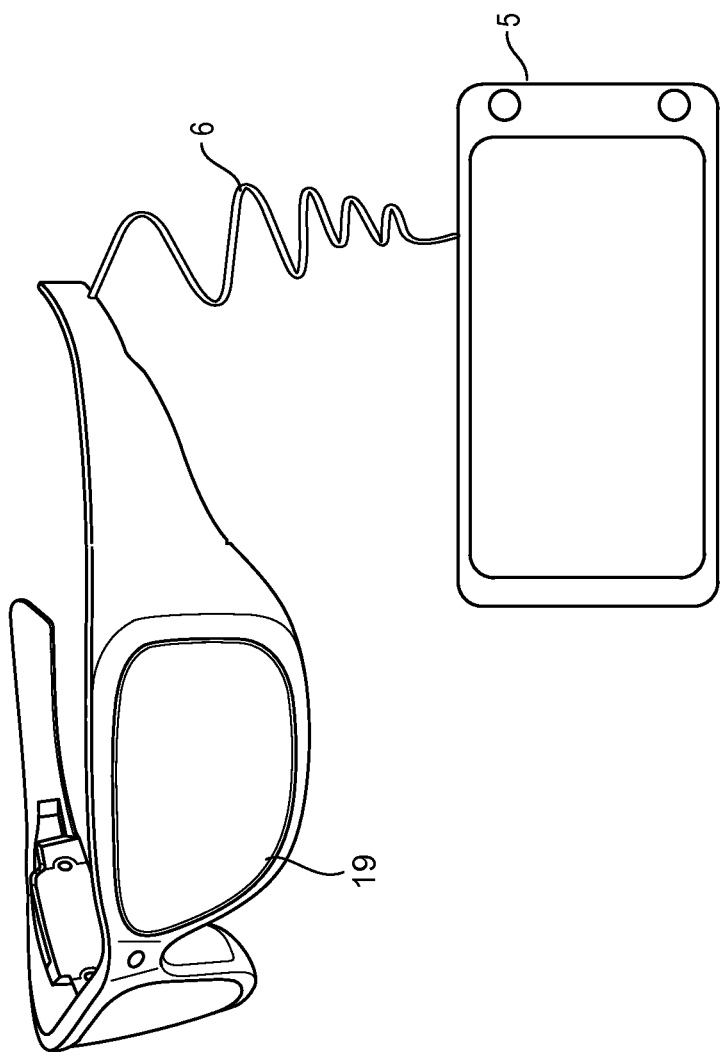
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19. Mobile device 5 may also provide motion and/or orientation information associated with mobile device 5 to mobile device 19. In one example, the motion information may include a velocity or acceleration associated with the mobile device 5 and the orientation information may include Euler angles, which provide rotational information around a particular coordinate system or frame of reference. In some cases, mobile device 5 may include a motion and orientation sensor, such as an inertial measurement unit (IMU), in order to acquire motion and/or orientation information associated with mobile device 5.

Figure 2B:
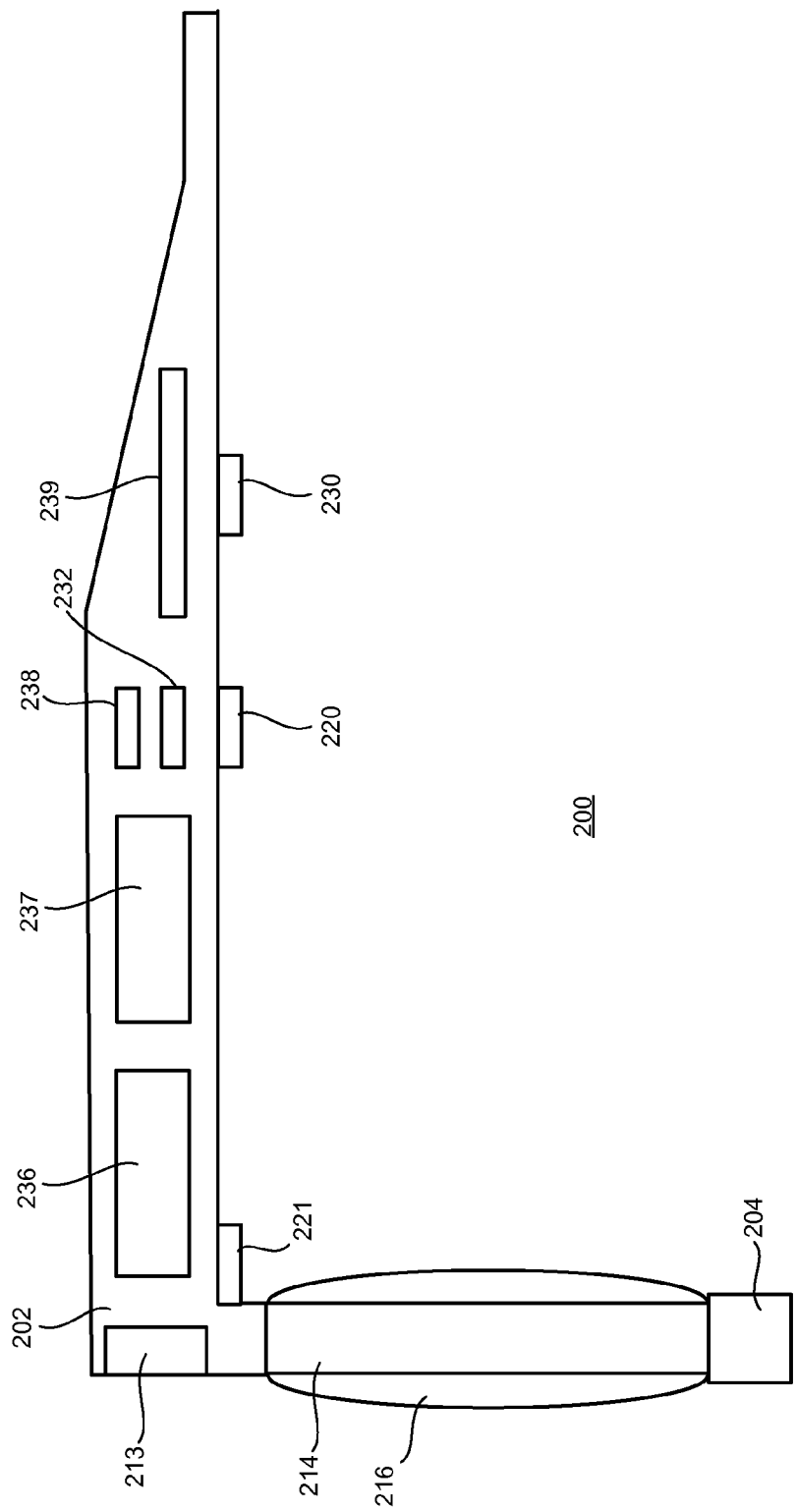
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
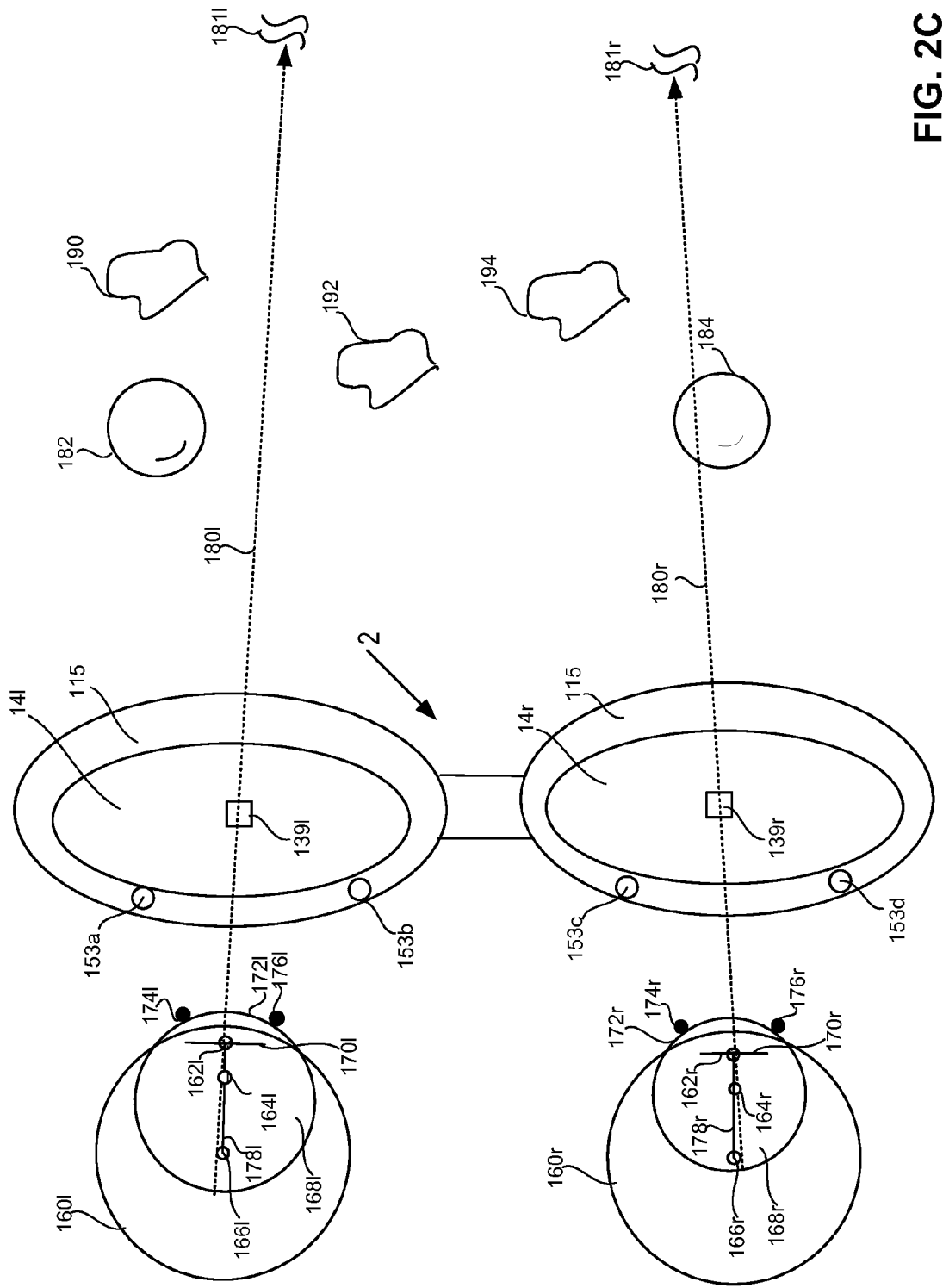
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
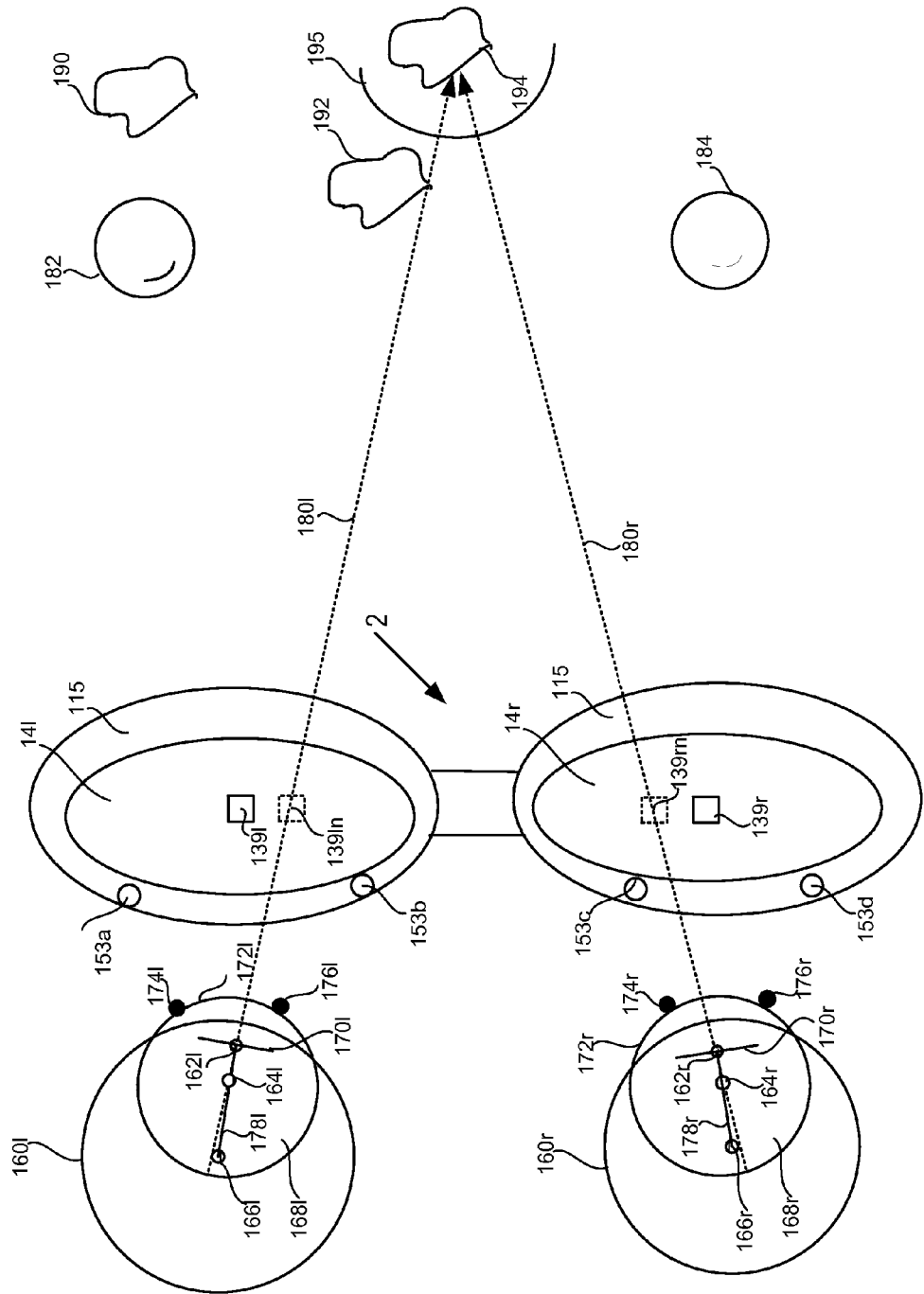
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object

194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*.

More information about determining the IPD for an end user of an HMD and adjusting the display optical systems accordingly can be found in U.S. patent application Ser. No. 13/250,878, entitled "Personal Audio/Visual System," filed Sep. 30, 2011, which is herein incorporated by reference in its entirety.

Figure 3A:
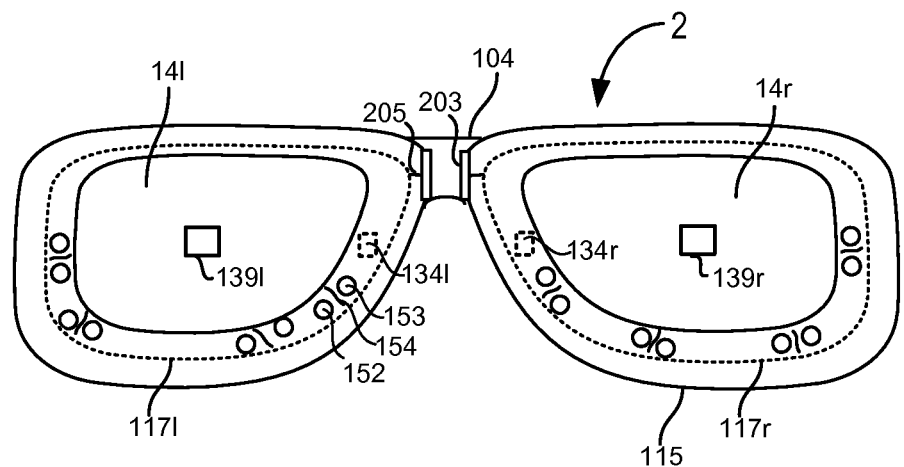
FIG. 3A depicts one embodiment of a portion of an HMD with movable display optical systems including gaze detection elements.

FIG. 3A depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 3A, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115. In some embodiments, the sensor 134 may comprise an image sensor or RGB camera for capturing images of an end user's eyes or facial features surrounding the eyes. Other inward facing image sensors may also be integrated with the frame 115 in order to capture fixed facial features associated with the end user such as their nasal bridge.

In one embodiment, the at least one sensor 134 may be a visible light camera (e.g., an RGB or color camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera may not be sensitive to the virtual image reflections on the eye.

In another embodiment, the at least one sensor 134 (i.e., 134*l* and 134*r*) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 3A, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 3A, each display optical system 14 and its arrangement of gaze detection elements facing each eye (e.g., such as camera 134 and its detection area 139, the illuminators 153, and photodetectors 152) are located on a movable inner frame portion 117*l*, 117*r*. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 3B:
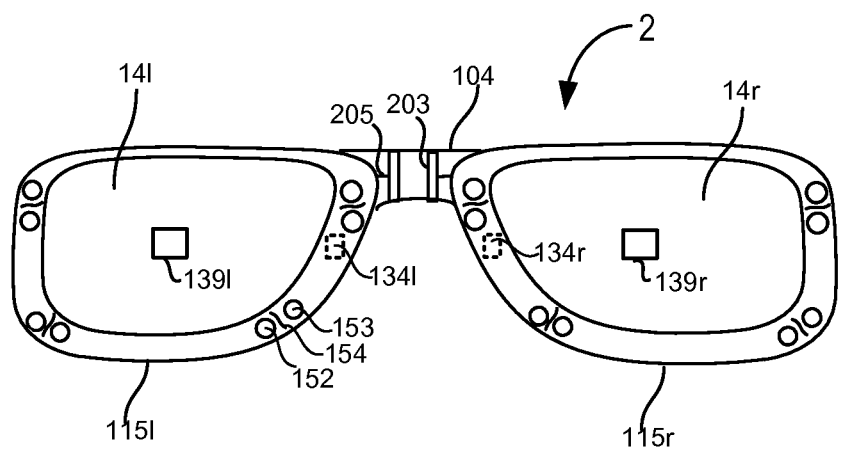
FIG. 3B depicts an alternative embodiment of a portion of an HMD with movable display optical systems including gaze detection elements.

FIG. 3B depicts an alternative embodiment of a portion of an HMD 2 with movable display optical systems including gaze detection elements. As depicted, each display optical system 14 is enclosed in a separate frame portion 115*l*, 115*r*. Each of the frame portions may be moved separately by the motors 203. In some embodiments, the at least one sensor 134 may comprise an image sensor or RGB camera for capturing images of an end user's eyes or facial features surrounding the eyes. Other inward facing image sensors may be integrated with the frame 115 in order to capture fixed facial features associated with the end user such as their nasal bridge.

Figure 4A:
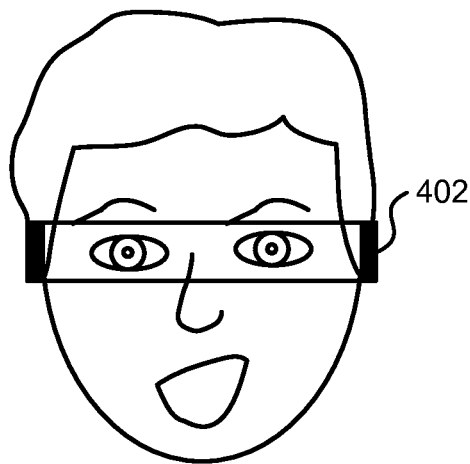
FIG. 4A depicts one embodiment of an HMD worn by an end user.
Figure 4B:
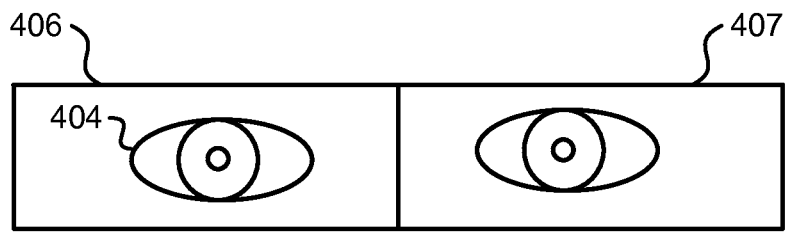
FIG. 4B depicts a pair of images taken using an inward facing camera integrated with the HMD.

FIG. 4A depicts one embodiment of an HMD 402 worn by an end user. The HMD 402 may comprise a mobile device, such as mobile device 19 in FIG. 1, and one or more inward facing cameras for capturing the end user's eyes or facial features surrounding the eyes. FIG. 4B depicts a pair of images 406-407 taken using an inward facing camera integrated with the HMD 402. The image 406 includes information corresponding with an eye 404 of the end user. Although a pair of images is depicted, head position information associated with the end user may be determined using a single image (e.g., image 406) or more than two images (e.g., a set of four images capturing portions of the end user's eyes). In some cases, head position information may be determined by averaging head position determinations corresponding with each of the pair of images 406-407. The pair of images 406-407 may correspond with an initial head position of the end user.

Figure 4C:
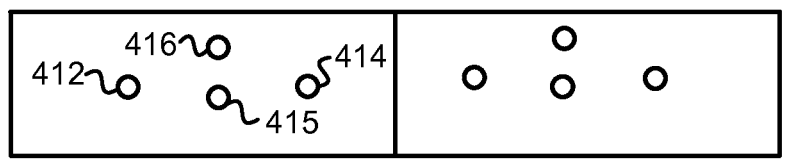
FIG. 4C depicts identifications of feature points corresponding with an eye of the end user.

FIG. 4C depicts identifications of feature points including feature points 412, 414, 415, and 416 corresponding with the eye 404 of the end user. The feature point 412 may correspond with the outer canthus of the end user's right eye, the feature point 414 may correspond with the inner canthus of the end user's right eye, and the feature point 415 may correspond with the pupil center of the end user's right eye. The outer canthus and the inner canthus may be identified even though the end user may squint their eyes over time (or blink). The feature point 416 may correspond with the inflection point (or maximum curvature point) of the end user's upper eyelid. Other feature points including the inflection point (or minimum curvature point) of the end user's lower eyelid, the end user's iris, the end user's nose bridge may also be identified by applying image processing techniques to the image 406.

Figure 4D:
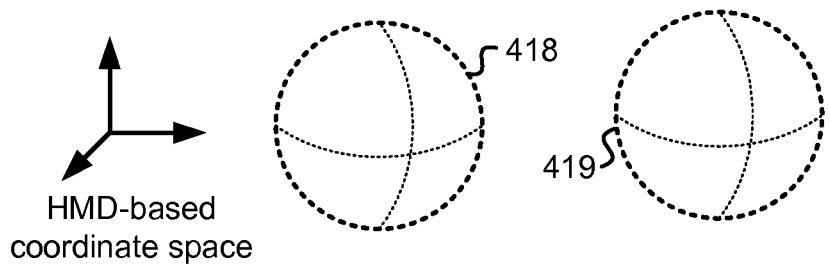
FIG. 4D depicts a 3D model of the end user's eyes positioned relative to the HMD.

FIG. 4D depicts a 3D model of the end user's eyes positioned relative to the HMD 402. Each of the end user's eyes may be modeled as spheres 418-419 or spheroids positioned within a three-dimensional coordinate space with respect to the HMD. As depicted, a first sphere 418 may correspond with the end user's right eye and a second sphere 419 may correspond with the end user's left eye. The positions of the spheres 418-419 within the three-dimensional coordinate space may be determined based on the feature points 412, 414, 415, and 416. Moreover, as the end user's eye positions are fixed with respect to their head, the IPD between the two spheres 418-419 may be determined during an initialization procedure (e.g., when the end user first puts on the HMD) and used to locate the positions of the spheres 418-419 within the three-dimensional coordinate space.

Figure 4E:
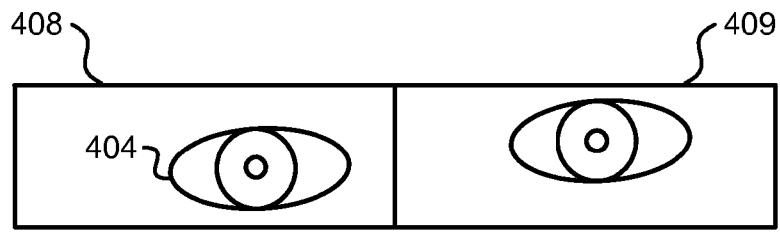
FIG. 4E depicts a second pair of images taken using an inward facing camera integrated with the HMD.

FIG. 4E depicts a second pair of images 408-409 taken using an inward facing camera integrated with the HMD 402. The image 408 includes information corresponding with the eye 404 of the end user. Although a pair of images is depicted, head position information associated with the end user may be determined using a single image (e.g., image 408) or two or more images. In some cases, head position information may be determined by averaging head position determinations corresponding with each image of the pair of images 408-409. The pair of images 408-409 may correspond with a subsequent head position of the end user captured at some time subsequent to the capturing of the images 406-407. In one example, the pair of images 408-409 are captured 1 ms after the pair of images 406-407 are captured.

Figure 4F:
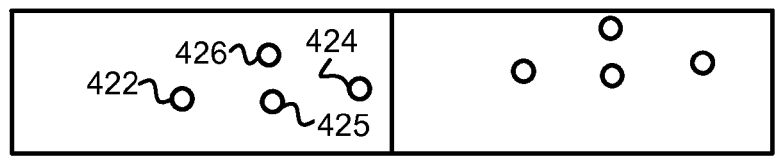
FIG. 4F depicts identifications of feature points corresponding with an eye of the end user.

FIG. 4F depicts identifications of feature points including feature points 422, 424, 425, and 426 corresponding with the eye 404 of the end user. The feature point 422 may correspond with the outer canthus of the end user's right eye, the feature point 424 may correspond with the inner canthus of the end user's right eye, and the feature point 425 may correspond with the pupil center of the end user's right eye. The outer canthus and the inner canthus may be identified even though the end user may squint their eyes periodically over time. The feature point 426 may correspond with the inflection point (or maximum curvature point) of the end user's upper eyelid. Other feature points including the inflection point (or minimum curvature point) of the end user's lower eyelid and the end user's nose bridge may also be identified by applying image processing techniques to the image 408.

Figure 4G:
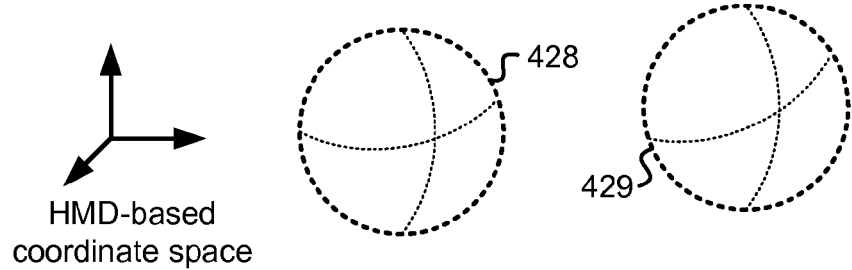
FIG. 4G depicts an updated 3D model of the end user's eyes positioned relative to the HMD.

FIG. 4G depicts an updated 3D model of the end user's eyes positioned relative to the HMD 402. Each of the end users eyes may be modeled as spheres 428-429 or spheroids positioned within a three-dimensional coordinate space with respect to the HMD. As depicted, a first sphere 428 may correspond with the end users right eye and a second sphere 429 may correspond with the end users left eye. The positions of the spheres 428-429 within the three-dimensional coordinate space may be determined based on the feature points 422, 424, 425, and 426. In one embodiment, the positions of the eyes within the updated 3D model may be determined using a rotation and translation algorithm to find the best fitting 3D rotation and translation of the feature points 422, 424, 425, and 426 that match the feature points 412, 414, 415, and 416 associated with the initial head position of the end user.

Figure 4H:
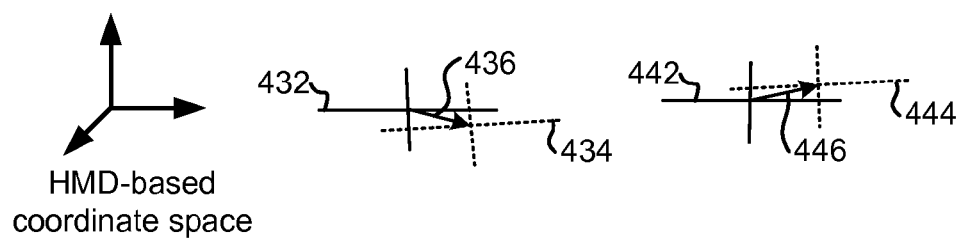
FIG. 4H depicts one embodiment of a representation of changes in an end user's eye position over time.

FIG. 4H depicts one embodiment of a representation of changes in an end user's eye position over time. As depicted, a first position and orientation 432 corresponding with sphere 418 may move to a second position and orientation 434 of sphere 428. The change in the center of the sphere 418 representing movement in the end users right eye may be described using vector 436. Similarly, a first position and orientation 442 corresponding with sphere 419 may move to a second position and orientation 444 of sphere 429. The change in the center of the sphere 419 representing movement in the end user's left eye may be described using vector 446.

In one embodiment, a head position vector may comprise a vector orthogonal to a line connecting the center of spheres 428-429 and intersecting the midpoint of a line connecting the inner canthus of the end user's right eye and the inner canthus of the end users left eye. The head position vector may comprise a three-dimensional vector within the three-dimensional coordinate space with respect to the HMD.

In some cases, an HMD may capture a plurality of images of an end user's eyes and/or the end user's facial region surrounding the eyes while the end user is viewing an augmented reality environment using the HMD. As the end user's eyes are fixed relative to their head position, fixed feature points associated with the end user's eyes may be used to determine a head position associated with the end user. The HMD may apply image processing techniques to the captured images in order to detect and track feature points corresponding with the end user's eyes. Once feature points associated with one or both of the end user's eyes are identified, position and orientation information associated with a 3D model of the end user's eyes (e.g., comprising a pair of spheroids) may be updated based on the feature points, and a head position vector (e.g., represented as a 3D vector) may be determined based on the 3D model.

Figure 5:
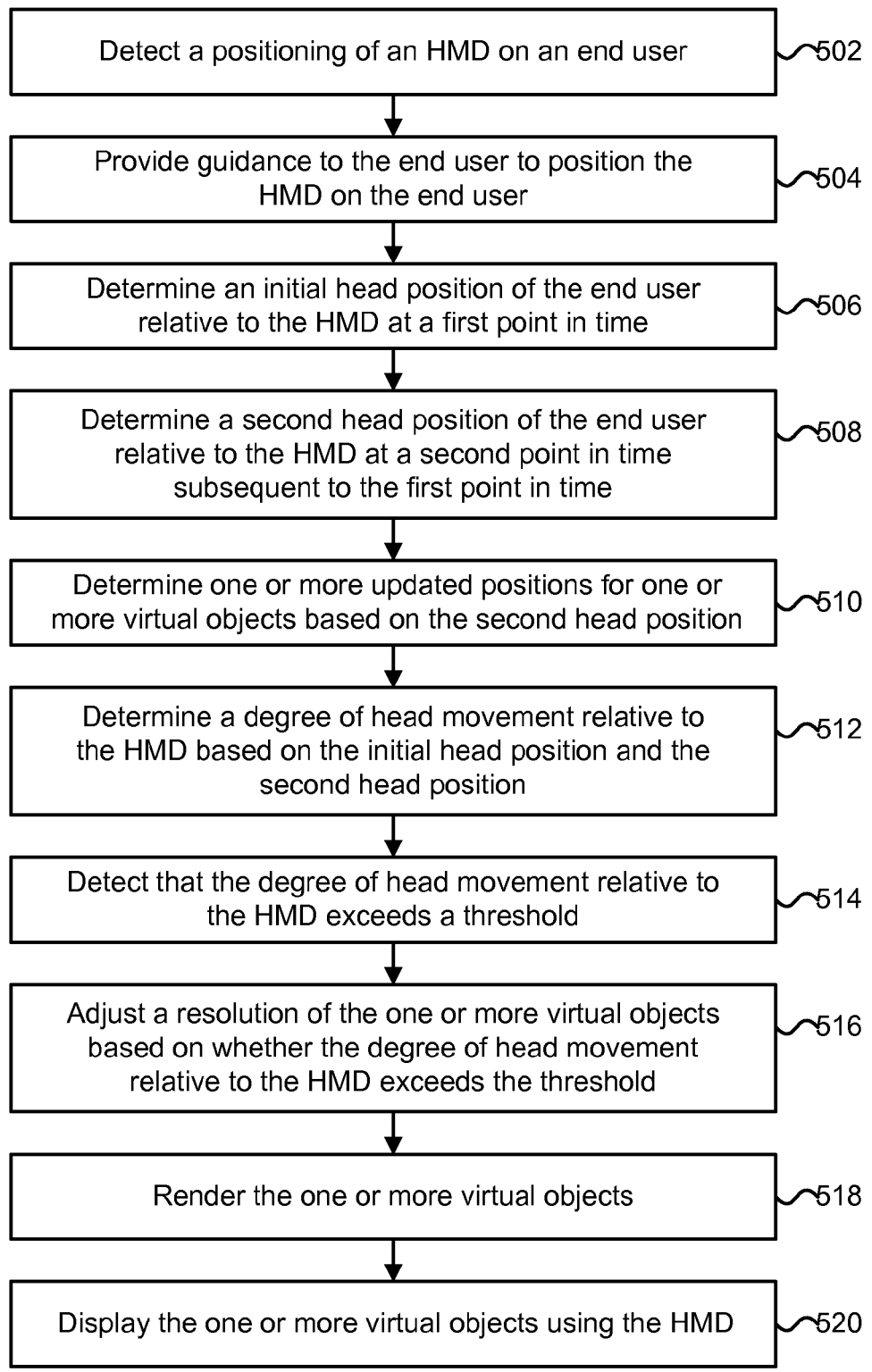
FIG. 5 is a flowchart describing one embodiment of a method for tracking the head position of an end user of an HMD relative to the HMD and adjusting the position of virtual objects based on the head position relative to the HMD.

FIG. 5 is a flowchart describing one embodiment of a method for tracking the head position of an end user of an HMD relative to the HMD and adjusting the position of virtual objects based on the head position relative to the HMD. In one embodiment, the process of FIG. 5 may be performed by a mobile device, such as mobile device 19 in FIG. 1.

In step 502, a positioning of an HMD on an end user is detected. The positioning of the HMD may be detected when the HMD is placed on or near the head of the end user. In step 504, guidance is provided to the end user to position the HMD on the end user. The guidance provided to the end user may comprise the display of alignment markers to the end user in order to allow the end user to properly align or fit the HMD to their head.

In step 506, an initial head position of the end user relative to the HMD is determined at a first point in time. The initial head position may be determined in response to the end user correctly positioning the HMD on their head. In one embodiment, the initial head position may be determined by capturing images of the end user's eyes or facial features surrounding the eyes using one or more inward facing cameras, identifying feature points associated with the end user's eyes by applying image processing techniques to the captured images, and then using the identified feature points to determine a position and orientation associated with a 3D model of the end user's eyes.

In step 508, a second head position of the end user is determined relative to the HMD at a second point in time subsequent to the first point in time. The second head position may be different from the initial head position. In some cases, subsequent head positions may be determined periodically (e.g., every 1-2 ms). In one embodiment, the second head position may be determined by capturing additional images of the end user's eyes or facial features surrounding the eyes using one or more inward facing cameras, identifying feature points associated with the end user's eyes by applying image processing techniques to the captured images, and then using the identified feature points to determine updated position and orientation associated with the 3D model of the end user's eyes. In one example, the positions of the end user's eyes within the updated 3D model may be determined using a rotation and translation algorithm to find the best fitting 3D rotation and translation of the feature points associated with the second head position that match the feature points associated with the initial head position of the end user.

In step 510, one or more updated positions for one or more virtual objects are determined based on the second head position. In some cases, if the end user's head position (or eye position) shifts relative to the initial head position (e.g., due to the end user riding on a bumpy road or accidentally touching the HMD as they wear the HMD), then the HMD may adjust the position of virtual objects displayed to the end user such that the virtual objects appear to be fixed or otherwise located appropriately within the augmented reality environment.

In step 512, a degree of head movement relative to the HMD is determined based on the initial head position and the second head position. The degree of head movement may correspond with changes in position and/or orientation of the end user's head from the initial head position to the second head position. In some embodiments, the degree of head movement may correspond with the maximum vector difference among a plurality of head tracking vectors. For example, in the case where an end user's head position is determined and tracked every millisecond, the degree of head movement may correspond with the maximum change in head position during a period of one second (i.e., the degree of head movement may correspond with the maximum vector difference among the thousand head tracking vectors associated with each of the head positions during the one second time period).

In step 514, it is detected that the degree of head movement relative to the HMD exceeds a threshold. In one example, the degree of head movement relative to the HMD may be exceeded if the degree of head movement exceeds five cm. In step 516, a resolution of the one or more virtual objects may be adjusted based on whether the degree of head movement relative to the HMD exceeds the threshold. In some embodiments, the resolution and/or number of virtual objects generated and displayed to the end user may be modified based on a degree of head movement relative to the HMD. In one example, both the resolution and number of virtual objects displayed to the end user may be reduced (e.g., cut in half) if the degree of head movement exceeds a threshold (e.g., if the end user's head position moves more than four centimeters relative to the HMD from an initial head position). The HMD may also provide a notification to the end user (e.g., a display notification or audio notification) if the degree of head movement exceeds the threshold and provide guidance to the end user to realign or reposition the HMD to the end user's head.

In step 518, the one or more virtual objects are rendered. In step 520, the one or more virtual objects are displayed using the HMD. In one embodiment, one or more images corresponding with the one or more virtual objects are rendered and displayed on the HMD such that the one or more virtual objects are perceived to exist within an augmented reality environment displayed to the end user of the HMD.

Figure 6:
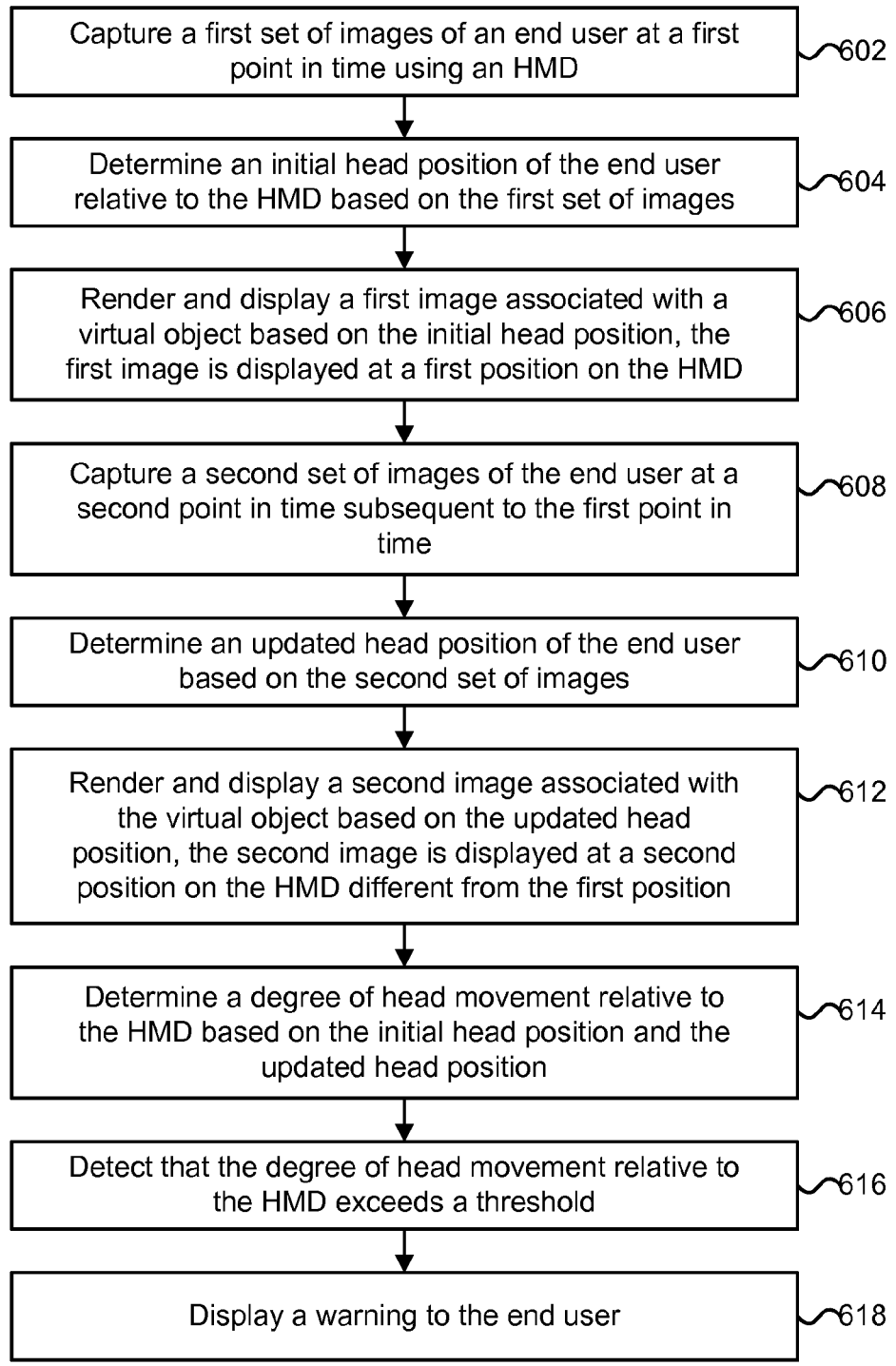
FIG. 6 is a flowchart describing an alternative embodiment of a method for tracking the head position of an end user of an HMD relative to the HMD.

FIG. 6 is a flowchart describing an alternative embodiment of a method for tracking the head position of an end user of an HMD relative to the HMD. In one embodiment, the process of FIG. 6 may be performed by a mobile device, such as mobile device 19 in FIG. 1.

In step 602, a first set of images of an end user is captured at a first point in time using an HMD. The first set of images may be captured using one or more inward facing cameras integrated with the HMD. In step 604, an initial head position of the end user relative to the HMD is determined based on the first set of images. The initial head position may be determined in response to the end user correctly positioning the HMD on their head. In one embodiment, the initial head position may be determined by capturing images of the end user's eyes or facial features surrounding the eyes using one or more inward facing cameras, identifying feature points associated with the end user's eyes by applying image processing techniques to the captured images, and then using the identified feature points to determine a position and orientation associated with a 3D model of the end user's eyes.

In step 606, a first image associated with a virtual object is rendered and displayed based on the initial head position. The first image may be displayed at a first position on the HMD. In step 608, a second set of images of the end user is captured at a second point in time subsequent to the first point in time. In step 610, an updated head position of the end user is determined based on the second set of images. The updated head position may be different from the initial head position. In some cases, subsequent head positions may be determined periodically (e.g., every 1-2 ms). In one embodiment, the updated head position may be determined by capturing additional images of the end user's eyes or facial features surrounding the eyes using one or more inward facing cameras, identifying feature points associated with the end user's eyes by applying image processing techniques to the captured images, and then using the identified feature points to determine updated position and orientation associated with the 3D model of the end user's eyes. In one example, the positions of the end user's eyes within the updated 3D model may be determined using a rotation and translation algorithm to find the best fitting 3D rotation and translation of the feature points associated with the updated head position that match the feature points associated with the initial head position of the end user.

In step 612, a second image associated with the virtual object is rendered and displayed based on the updated head position. The second image may be displayed at a second position on the HMD different from the first position. In one example, if the end user's head position (or eye position) shifts relative to the initial head position with respect to the HMD (e.g., due to the end user riding on a bumpy road or accidentally touching the HMD as they wear the HMD), then the HMD may adjust the position of virtual objects displayed to the end user such that the virtual objects appear to be fixed or otherwise located appropriately within the augmented reality environment.

In step 614, a degree of head movement relative to the HMD is determined based on the initial head position and the updated head position. The degree of head movement may correspond with changes in position and/or orientation of the end user's head from the initial head position to the updated head position. In some embodiments, the degree of head movement may correspond with the maximum vector difference among a plurality of head tracking vectors. For example, in the case where an end user's head position is determined and tracked every 0.2 milliseconds, the degree of head movement may correspond with the maximum change in head position during a period of two seconds.

In step 616, it is detected that the degree of head movement relative to the HMD exceeds a threshold. In one example, the degree of head movement relative to the HMD may be exceeded if the degree of head movement exceeds two cm. In step 618, a warning is displayed to the end user if the degree of head movement relative to the HMD exceeds the threshold. In one embodiment, the warning may be displayed to the end user as virtual text appearing within the augmented reality environment.

One embodiment of the disclosed technology includes one or more processors in communication with a see-through display. The one or more processors determine an initial head position of an end user of the electronic device relative to the electronic device at a first point and time and determine a second head position of the end user relative to the electronic device at a second point in time subsequent to the first point in time. The second head position is different from the initial head position. The one or more processors render a second image associated with a virtual object based on the second head position. The see-through display displays the second image such that the virtual object is perceived to exist within an augmented reality environment displayed to the end user of the electronic device.

One embodiment of the disclosed technology includes determining an initial head position of the end user relative to the HMD at a first point and time and rendering and displaying a first image associated with a virtual object based on the initial head position of the end user relative to the HMD. The first image is displayed at a first position on the HMD. The method further includes determining a second head position of the end user relative to the HMD at a second point in time subsequent to the first point in time. The second head position is different from the initial head position. The method further includes rendering and displaying a second image associated with the virtual object based on the second head position of the end user relative to the HMD. The second image is displayed at a second position on the HMD different from the first position.

One embodiment of the disclosed technology includes capturing a first set of images of the end user at a first point in time. The first set of images capture at least a portion of the end user's eyes. The method further includes determining an initial head position of the end user relative to the HMD based on the first set of images, rendering and displaying a first image associated with a virtual object based on the initial head position of the end user relative to the HMD, capturing a second set of images of the end user at a second point in time subsequent to the first point in time, and determining a second head position of the end user relative to the HMD based on the second set of images. The second head position is different from the initial head position. The method further includes rendering and displaying a second image associated with the virtual object based on the second head position of the end user relative to the HMD.

Figure 7:
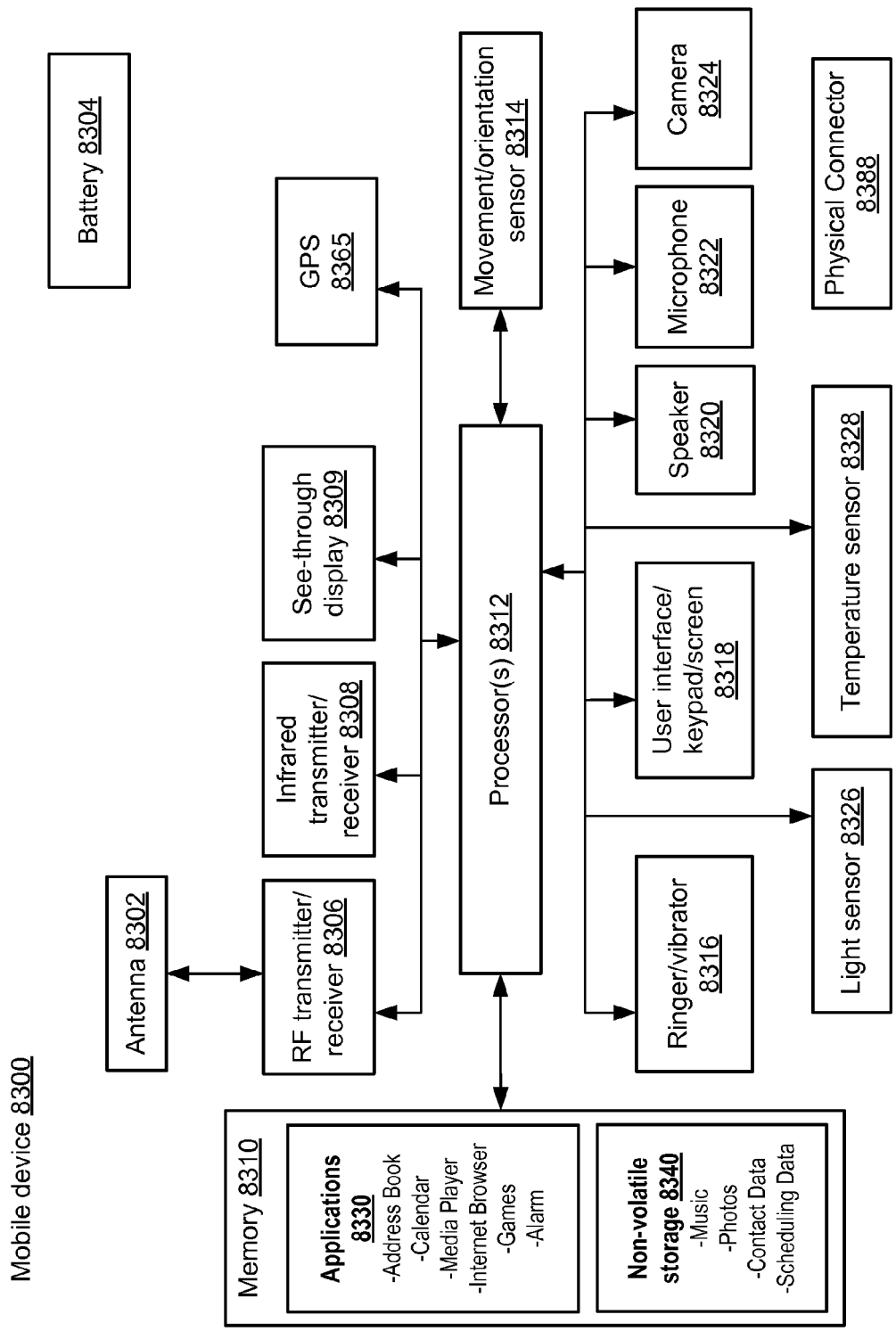
FIG. 7 is a block diagram of one embodiment of a mobile device.

FIG. 7 is a block diagram of one embodiment of a mobile device 8300, such as mobile device 19 in FIG. 1. Mobile devices may include laptop computers, pocket computers, mobile phones, HMDs, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device for displaying an augmented reality environment, comprising:
    one or more processors, the one or more processors determine an initial head position of an end user of the electronic device relative to the electronic device at a first point in time, the one or more processors render a first image associated with a virtual object based on the initial head position, the one or more processors determine a second head position of the end user relative to the electronic device at a second point in time subsequent to the first point in time, the second head position is different from the initial head position, the one or more processors detect that a degree of head movement relative to the electronic device has exceeded a threshold amount based on the initial head position and the second head position, the one or more processors render a second image associated with the virtual object based on the second head position; and
    a see-through display in communication with the one or more processors, the see-through display displays the first image using a first resolution for the virtual object, the see-through display displays the second image using a second resolution for the virtual object less than the first resolution in response to detecting that the degree of head movement relative to the electronic device has exceeded the threshold amount.

2. The electronic device of claim 1, wherein:
the electronic device comprises an HMD.

3. The electronic device of claim 2, wherein:
the one or more processors reduce a number of virtual objects displayed on the HMD in response to detecting that the degree of head movement relative to the HMD has exceeded the threshold amount.

4. The electronic device of claim 3, wherein:
the second resolution is half of the first resolution; and
the number of virtual objects displayed on the HMD is cut in half in response to detecting that the degree of head movement relative to the HMD has exceeded the threshold amount.

5. The electronic device of claim 3, wherein:
the see-through display displays a warning to the end user if the degree of head movement exceeds the threshold amount.

6. The electronic device of claim 3, wherein:
the one or more processors detect that the degree of head movement relative to the HMD has exceeded the threshold amount by determining a maximum vector difference among a plurality of head tracking vectors, a first head tracking vector of the plurality of head tracking vectors is based on a difference between the second head position and the initial head position.

7. The electronic device of claim 2, wherein:
the one or more processors determine an absolute head position vector representing a head position of the end user relative to an environment in which the HMD exists.

8. A method for tracking a head position of an end user of an HMD relative to the HMD, comprising:
    determining an initial head position of the end user relative to the HMD at a first point in time;
    rendering and displaying a first image associated with a virtual object based on the initial head position of the end user relative to the HMD, the first image is displayed on the HMD using a first resolution for the virtual object;
    determining a second head position of the end user relative to the HMD at a second point in time subsequent to the first point in time, the second head position is different from the initial head position;
    detecting that a degree of head movement relative to the HMD has exceeded a threshold amount based on the initial head position and the second head position; and
    rendering and displaying a second image associated with the virtual object based on the second head position of the end user relative to the HMD, the second image is displayed on the HMD using a second resolution for the virtual object less than the first resolution in response to detecting that the degree of head movement relative to the HMD has exceeded the threshold amount.

9. The method of claim 8, further comprising:
reducing a number of virtual objects displayed on the HMD in response to detecting that the degree of head movement relative to the HMD has exceeded the threshold amount.

10. The method of claim 9, wherein:
the second resolution is half of the first resolution; and the number of virtual objects displayed on the HMD is cut in half in response to detecting that the degree of head movement relative to the HMD has exceeded the threshold amount.

11. The method of claim 9, further comprising:
displaying a warning to the end user if the degree of head movement exceeds the threshold amount.

12. The method of claim 9, wherein:
the detecting that a degree of head movement relative to the HMD has exceeded the threshold amount includes determining a maximum vector difference among a plurality of head tracking vectors, a first head tracking vector of the plurality of head tracking vectors is based on a difference between the second head position and the initial head position.

13. The method of claim 8, wherein:
the determining an initial head position includes capturing one or more images of the end user while the end user is wearing the HMD, the one or more images capture at least a portion of an eye of the end user, the determining an initial head position includes identifying one or more feature points associated with the eye of the end user by applying image processing techniques to the one or more images and determining a position and orientation associated with a 3D model of the end user's eyes based on the identifying one or more feature points.

14. The method of claim 13, wherein:
the capturing one or more images is performed by an inward facing camera associated with the HMD.

15. The method of claim 8, further comprising:
determining an absolute head position vector representing a head position of the end user relative to an environment in which the HMD exists.

16. One or more computer readable memory devices containing processor readable code for programming one or more processors to perform a method for tracking a head position of an end user of an HMD relative to the HMD comprising the steps of:
capturing a first set of images of the end user at a first point in time, the first set of images capture at least a portion of an eye of the end user;
determining an initial head position of the end user relative to the HMD based on the first set of images;
rendering and displaying a first image associated with a virtual object based on the initial head position of the end user relative to the HMD, the first image is displayed on the HMD using a first resolution for the virtual object;
capturing a second set of images of the end user at a second point in time subsequent to the first point in time;
determining a second head position of the end user relative to the HMD based on the second set of images, the second head position is different from the initial head position;
detecting that a degree of head movement relative to the HMD has exceeded a threshold amount based on the initial head position and the second head position; and
rendering and displaying a second image associated with the virtual object based on the second head position of the end user relative to the HMD, the second image is displayed on the HMD using a second resolution for the virtual object less than the first resolution in response to detecting that the degree of head movement relative to the HMD has exceeded the threshold amount.

17. The one or more computer readable memory storage devices of claim 16, further comprising:
reducing a number of virtual objects displayed on the HMD in response to detecting that the degree of head movement relative to the HMD has exceeded the threshold amount.

18. The one or more computer readable memory storage devices of claim 17, further comprising:
the second resolution is half of the first resolution; and
the number of virtual objects displayed on the HMD is cut in half in response to detecting that the degree of head movement relative to the HMD has exceeded the threshold amount.

19. The one or more computer readable memory devices of claim 17, further comprising:
displaying a warning to the end user if the degree of head movement exceeds the threshold amount.

20. The one or more computer readable memory devices of claim 16, further comprising:
determining an absolute head position vector representing a head position of the end user relative to an environment in which the HMD exists; and
transmitting the absolute head position vector to a server.

* * * * *